United States Patent [19]

Poat et al.

[11] 3,732,109
[45] May 8, 1973

[54] READY-TO-EAT OAT CEREAL BISCUIT

[75] Inventors: Jeffrey G. Poat, Schaumburg; Neal F. Smith, Libertyville, both of Ill.

[73] Assignee: The Quaker Oats Company, Chicago, Ill.

[22] Filed: Jan. 27, 1971

[21] Appl. No.: 110,248

[52] U.S. Cl. ........................................... 99/83, 99/82
[51] Int. Cl. ....................................... A23l 1/10
[58] Field of Search ........................... 99/83, 84

[56] References Cited

UNITED STATES PATENTS

| | | | |
|---|---|---|---|
| 2,707,153 | 4/1955 | Beheran | 99/83 |
| 2,868,647 | 1/1959 | Vollink | 99/83 |
| 3,615,676 | 10/1971 | Zietlow | 99/83 |

*Primary Examiner*—Raymond N. Jones
*Attorney*—Milton C. Hansen and Donnie Rudd

[57] ABSTRACT

A ready-to-eat oat cereal biscuit is produced by admixing oat flour and water, subjecting the mixture to a water boiling temperature and a superatmospheric pressure, releasing the pressure, forming flakes from the released pressure mixture, drying the flakes to a critical moisture content, subdividing the flakes to a specified size, mixing the subdivided pieces with syrup, then compacting the mixture to form a biscuit and drying the formed biscuits.

A ready-to-eat oat cereal biscuit is disclosed comprising finely subdivided oat flakes and syrup compressed together and dried to a moisture content from about 4 percent to 5 percent by weight.

1 Claim, No Drawings

READY-TO-EAT OAT CEREAL BISCUIT

BACKGROUND OF THE INVENTION

1. FIELD OF THE INVENTION

This invention relates to a ready-to-eat cereal biscuit which can be consumed as is or in the usual manner such as in a cereal bowl with milk added thereto.

2. DESCRIPTION OF THE PRIOR ART

Many attempts have been made to provide ready-to-eat cereal biscuits which are good tasting and nutritious. Among the more successful of such cereal biscuits are the well-known shredded wheat products. With the exception of shredded wheat, however, there has been little success in providing a ready-to-eat cereal biscuit comprised predominantly of the non-wheat cereals. There is not a successful cereal biscuit now produced which uses oats as its base. The primary reason for this lack of success is that the flavoring ingredients such as sugar and syrup which would normally be required to give an acceptable product seem to act adversely when subjected to the severe conditions of common cereal processing. Also, when oat cereal products are produced having large particles of cereal therein, the biscuit formed therefrom does not seem to have much success.

The present invention overcomes each of the problems associated with prior products and provides a good tasting ready-to-eat oat cereal biscuit.

SUMMARY OF THE INVENTION

It is an object of this invention to provide a process for producing a ready-to-eat oat cereal biscuit.

It is another object of this invention to provide a process for producing a good tasting and highly palatable oat cereal biscuit.

It is still another object of this invention to provide a process for producing a highly nutritious ready-to-eat oat cereal biscuit.

It is a still further object of this invention to provide a highly nutritious and good tasting ready-to-eat oat cereal biscuit.

The objects of this invention are accomplished by a process for producing a ready-to-eat oat cereal biscuit comprising: admixing oat flour with water, said water being admixed in an amount sufficient to produce a moisture content in the oat flour of from 10 to 25 percent by weight; subjecting the oat flour-water mixture to a water boiling temperature and a superatmospheric pressure; suddenly releasing the pressure on the mixture; forming the mixture into flake-shaped pieces; drying the flake-shaped pieces to a moisture content of from about 2 percent to about 6 percent by weight water, said drying being accomplished in an air stream having a temperature of from 400° to 800° F; subdividing the flake-shaped pieces until a substantial portion of the subdivided pieces will pass through a 3.5 mesh U.S. Standard Sieve; admixing the subdivided pieces with a syrup, said syrup having from 2 to 7 parts by weight sugar and from 1 to 4 parts by weight water, said syrup being admixed with the subdivided pieces in an amount such that the syrup to subdivided pieces weight ratio is from 1:2 to 1:3; compacting the syrup-subdivided pieces mixture to form a biscuit; and drying the formed biscuits to a moisture content of from about 4 to 5 percent by weight.

The objects of this invention are further accomplished by a ready-to-eat oat cereal biscuit comprising finely subdivided oat flakes and syrup compressed together and dried to a moisture content of from about 4 to 5 percent by weight.

The first step in our new and novel process comprises admixing oat flour with water. While it is acceptable to use a mixture comprising only oat flour and water, other products can be added to enhance the flavor while still not detracting from the oat flour flavor and texture. For instance, the oat flour mixture can be 100 percent oat flour or it can comprise a major portion of oat flour along with minor portions of corn flour, wheat flour and rice flour. If desired, it may also include up to about 10 percent by weight of a protein concentrate such as soy protein concentrate to enhance nutrition. It may also include added vitamins and minerals to enhance nutrition. The oat flour and water are admixed in an amount sufficient to produce a moisture content in the oat flour of from 10 to 25 percent by weight. Substantial deviation from these percentages will provide a mixture incapable of being subjected to the other processing conditions which follow.

The next step in our process is subjecting the oat flour-water mixture to a water boiling temperature and a superatmospheric pressure. This is customarily accomplished by use of the well-known cereal extruders. When such an extruder is used, the temperature of a product may vary from just above the boiling point of water up to the neighborhood of about 400° F. While the pressure on the product may vary from just over atmospheric pressure to a much larger amount, it is customary to operate the extruder up to a pressure of approximately 3,000 psi in order that release of the pressure will produce the desired effect. After the oat flour-water mixture has been subjected to a water boiling temperature and a superatmospheric pressure sufficient to gelatinize a portion of the starch in the oat flour, the pressure is suddenly released from the mixture in the cereal extruder. This is accomplished by passing the mixture through an orifice into the atmosphere. The mixture is then formed into flake-shaped pieces. This is accomplished normally by having the mixture pass through an orifice which is in the shape of a thin slit and then cutting the extruded portion into small pieces.

After the flake-shaped pieces are formed, they are dried to a moisture content of from about 2 percent to about 6 percent by weight water with this drying being accomplished in an air stream having a temperature of from 400° to 800° F. This drying can be accomplished by known commercial methods such as dropping the product into the air stream and having it conveyed to a separater by the air stream or else by placing the product on a conveyor and passing the air stream over the product. At this point it is preferable, although not critical, to have the bulk density of the flaked pieces from 0.32 oz. per cubic inch to 0.362 oz. per cubic inch.

After the oat flakes have been produced, they are subdivided until a substantial portion of the subdivided pieces will pass through a 3.5 mesh U. S. Standard Sieve. Although it is not critical, we prefer that the subdivision of the pieces be in such a manner that it gives the following sieve analysis:

| U.S. Standard Sieve | Amount (% by wt.) |
|---|---|
| on 3.5 mesh | 0.1 – 1.7% |
| on 8.0 mesh | 52.6 – 66.6% |
| on 14 mesh | 14.9 – 27.4% |
| on 30 mesh | 5.5 – 9.6% |
| thru 30 mesh | 11.7 – 16.2% | such a subdivision of the flake-shaped pieces will naturally increase the bulk density of the product.

After the subdivided pieces are prepared, they are admixed with a syrup. The syrup should have from 2 to 7 parts by weight of sugar with from 1 to 4 parts by weight water. By use of the term "sugar" we intend to mean the sugars commonly used in food products as well as the commonly used substitutes such as honey. While many commercial syrups have a sufficient sugar content to be used in our process, we prefer to prepare our own syrup using 4 parts by weight of common table sugar, 1 part by weight brown sugar, 1 part by weight honey and 4 parts by weight water with a very small portion of vegetable oil added thereto.

The syrup should be admixed with the subdivided pieces in an amount such that the weight ratio of the syrup to the subdivided oat flake pieces is from 1:2 to 1:3. Substantial deviation from these ranges will provide a mixture which either cannot be formed or else which will not retain its shape once it is formed.

After the subdivided pieces are admixed with the syrup they are compacted into a form of a biscuit. This can best be accomplished by placing the mixture in a mold, pressing the mixture into the mold and then removing the biscuit from the mold.

After the formed biscuits are prepared, they are then dried to a moisture content of from about 4 to 5 percent by weight and packaged.

The new and novel cereal product of this invention comprises finely subdivided oat flakes and syrup compressed together and dried to moisture content of from about 4 to 5 percent by weight. The optimum process for producing such oat flakes is that described in process above.

DESCRIPTION OF THE PREFERRED EMBODIMENTS

The following example may be taken to constitute a preferred embodiment of our invention although it in no way indicates a limit on our invention.

EXAMPLE

An oat flour mixture was prepared comprising 6 parts by weight oat flour with 3.5 parts by weight wheat flour and 1 part by weight sugar. The moisture was adjusted by adding water thereto until the moisture content of the flour was about 20 percent by weight. The mixture was then introduced into a cereal extruder wherein it was raised to a temperature of about 350° F and a pressure of from 2,600 to 2,750 psi. After approximately 3 minutes residence time in the extruder, the mixture was passed through a thin slit and immediately cut into particles having a length of about one-fourth to one-half inch and very closely resembling oat flakes. This material was immediately dropped into an air stream of about 550° F and conveyed therein until the moisture content of the flakes was about 4 percent by weight. After the flakes left the air stream, they lost another 1 percent by weight water. The flakes were then passed through a set of breaker rolls to subdivide them and give a screen analysis as follows:

| U.S. Standard Sieve | Amount (% by wt.) |
|---|---|
| on 3.5 mesh | 0.6% |
| on 8.0 mesh | 55.6% |
| on 14 mesh | 21.9% |
| on 30 mesh | 7.3% |
| thru 30 mesh | 14.6% |

A syrup mixture was next prepared by admixing 4 parts by weight sugar, 1 part by weight brown sugar, and 1 part by weight honey with 4 parts by weight water. One part by weight of the syrup was then mixed with 2 parts by weight of the subdivided oat flakes. This mixture was then placed in a mold and compressed until the volume was approximately reduced in half. The biscuits were then removed from the mold and dried to a moisture content of 4.5 percent by weight. The resulting product was placed in a cereal bowl and milk was added thereto. The result was a highly delicious and extremely nutritional product.

The new and novel process of this invention provides a new and novel product which has long been desired in the cereal industry. The product is good tasting and highly nutritious and overcomes the objections to prior attempted products.

Having fully described this new and unique invention, we claim:

1. A process for producing a ready-to-eat oat cereal biscuit comprising: admixing oat flour with water, said water being admixed in an amount sufficient to produce a moisture content in the oat flour of from 10 to 25 percent by weight; subjecting the oat flour-water mixture to a water boiling temperature and a superatmospheric pressure; suddenly releasing the pressure on the mixture; forming the mixture into flake-shaped pieces; drying the flake-shaped pieces to a moisture content of from about 2 percent to about 6 percent by weight water, said drying being accomplished in an air stream having a temperature of from 400° to 800° F; subdividing the flake-shaped pieces until a substantial portion of the subdivided pieces will pass through a 3.5 mesh U.S. Standard Sieve; admixing the subdivided pieces with a syrup, said syrup having from 2 to 7 parts by weight sugar and from 1 to 4 parts by weight water, said syrup being admixed with the subdivided pieces in an amount such that the syrup to subdivided pieces weight ratio is from 1:2 to 1:3; compacting the syrup-subdivided pieces mixture to form a biscuit; and drying the formed biscuits to a moisture content of from about 4 to 5 percent by weight.

* * * * *